(12) United States Patent
Minamisawa

(10) Patent No.: US 7,275,738 B2
(45) Date of Patent: Oct. 2, 2007

(54) CYLINDRICAL FLUID-FILLED VIBRATION DAMPING DEVICE

(75) Inventor: Tadamitsu Minamisawa, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 206 days.

(21) Appl. No.: 11/103,463

(22) Filed: Apr. 12, 2005

(65) Prior Publication Data

US 2005/0230889 A1    Oct. 20, 2005

(30) Foreign Application Priority Data

Apr. 14, 2004    (JP)    ............... 2004-119588

(51) Int. Cl.
*F16F 5/00*    (2006.01)
(52) U.S. Cl. ............... 267/140.12; 267/141.2
(58) Field of Classification Search .......... 267/140.12, 267/140.11, 141.2
See application file for complete search history.

(56) References Cited

U.S. PATENT DOCUMENTS

| | | | |
|---|---|---|---|
| 4,032,202 A * | 6/1977 | Ishikawa et al. ............ 384/220 |
| 4,605,207 A | 8/1986 | Konishi |
| 5,058,867 A | 10/1991 | Hadano et al. |
| 5,954,317 A * | 9/1999 | Meyer et al. .......... 267/140.12 |
| 6,007,060 A * | 12/1999 | Vermaerke ............. 267/140.12 |
| 6,672,574 B2 * | 1/2004 | Hamada et al. ........ 267/140.12 |
| 2004/0239020 A1 * | 12/2004 | Ito ........................ 267/140.12 |

FOREIGN PATENT DOCUMENTS

| | | |
|---|---|---|
| GB | 2 317 434 A | 3/1998 |
| JP | U 05-30584 | 4/1993 |
| JP | A 06-100731 | 4/1994 |
| JP | Y2 07-3073 | 1/1995 |
| JP | B2 07-74658 | 8/1995 |
| JP | A 08-177940 | 7/1996 |
| JP | A 10-89393 | 4/1998 |
| JP | A 2002-323085 | 11/2002 |

* cited by examiner

*Primary Examiner*—Bradley King
(74) *Attorney, Agent, or Firm*—Oliff & Berridge PLC

(57) ABSTRACT

A cylindrical fluid-filled vibration-damping device including a rubber elastic body elastically connecting an inner and intermediate cylindrical sleeve having an opening portion defined by ring portions and a connecting portion, and an outer cylindrical sleeve disposed on the intermediate sleeve, thereby forming a primary fluid chamber filled with a fluid inside an recessed portion of the rubber elastic body, an auxiliary fluid chamber filled with the fluid and defined by a diaphragm portion and an orifice passage connecting the primary fluid chamber and auxiliary fluid chamber between itself and the connecting portion. A stopper member disposed on the inner cylindrical sleeve and protruding radially in one direction towards the opening portion of the intermediate cylindrical sleeve, and an elastic body striking portion formed of self-lubricating rubber and having a low coefficient of friction and disposed on an inner circumferential surface side of the outer cylindrical sleeve to be opposite to a tip of the stopper member.

4 Claims, 7 Drawing Sheets

CYLINDRICAL FLUID-FILLED VIBRATION DAMPING DEVICE

INCORPORATED BY REFERENCE

The disclosure of Japanese Patent Application No. 2004-119588 filed on Apr. 14, 2004 including the specification, drawings and abstract is incorporated herein by reference in its entirety.

BACKGROUND OF THE INVENTION

1. Field of the Invention

The present invention relates to a cylindrical fluid-filled vibration-damping device used as vehicle engine mounts or the like.

2. Description of the Related Art

A known cylindrical fluid-filled vibration-damping device of this kind includes: an inner cylindrical metal sleeve, and a tubular intermediate metal sleeve as well as an outer cylindrical metal sleeve that are disposed about the inner cylindrical metal sleeve with a radial spacing therebetween. A stopper member is mounted on the outer circumferential surface of the inner sleeve, protruding radially in one direction towards an opening in the intermediate sleeve, with its tip or distal end opposed to the inner circumferential surface of the outer cylindrical sleeve with a gap therebetween. A rubber elastic body is disposed in between and elastically connects the inner cylindrical sleeve and the intermediate sleeve. The rubber elastic body is formed with a recessed portion opening towards the outer cylindrical sleeve and surrounding the stopper member, and a diaphragm portion radially opposite to the recessed portion. This cylindrical fluid-filled vibration-damping device includes a primary fluid chamber that formed between the recessed portion and the outer sleeve, and an auxiliary fluid chamber formed between the diaphragm portion and the outer cylindrical sleeve. An orifice passage is formed between the outer and the intermediate sleeve for connecting the primary and auxiliary fluid chambers to each other to permit a fluid communication between the chambers.

This vibration-damping device is installed on a vehicle by fixing the inner cylindrical sleeve and the outer cylindrical sleeve on the engine side member and the vehicle body side member with the primary fluid chamber and auxiliary fluid chamber disposed vertically. Upon vibrational input between the inner and outer cylindrical sleeves due to the vibration of the engine or the like, the vibration-damping device is able to damp those vibrations with the elastic action of the rubber elastic body and the resonance action of the fluid column of fluid flowing through the orifice passage between the primary fluid chamber and auxiliary fluid chamber. When vibrational input in a so-called "bound" direction becomes excessive, the stopper member strikes the inner circumferential surface of the opposing outer cylinder sleeve, whereby excessive relative displacement between the inner and outer cylindrical sleeves is suppressed and vibration is rapidly damped. However, the aforementioned stopper member is formed of a hard material such as metal or resin and, furthermore, its surface is covered with a thin rubber coating layer. At the time of the above mentioned excessive vibrational input, stick slip occurs easily because of the tip side firmly striking and grinding against the metal surface of the outer cylindrical sleeve. A problem is that noise generated along with this stick slip causes discomfort to passengers in the vehicle.

With this regards, JP-A-2002-323085, for example, discloses the use of a cylindrical rubber mount with a stopper disposed projecting towards an outer cylindrical sleeve from an inner axial sleeve, and the connection of the inner axial sleeve with the outer cylindrical sleeve by a main rubber elastic body. In this cylindrical rubber mount, the stopper is formed of a hard stopper body and a shock absorbing rubber layer adhered to the projecting tip surface thereof. Furthermore, the striking surface of the outer cylindrical sleeve which is struck by the stopper is a surface to which no adhesive is adhered. As a result, stick slip is prevented from occurring when the stopper strikes the striking surface of the outer cylindrical sleeve. Also, as disclosed in JP-U-7-3073, for example, another vibration-damping device is known wherein surface variations are formed on either a stopper comprising a rubber elastic body or the inner circumferential surface of the outer cylindrical sleeve which is struck by the stopper. The coefficient of friction of the striking surface is reduced, whereby stick slip that may occur when the stopper strikes is suppressed.

However, the aforementioned cylindrical fluid-filled vibration-damping devices are not necessarily sufficient to suppress stick slip because of the magnitude of the principal vibrational input and it is necessary to further suppress noise within the vehicle in order to improve the ride quality of the vehicle. It is therefore desirable to further ensure the suppression of stick slip of the stopper for the fluid-filled cylindrical vibration-damping devices.

SUMMARY OF THE INVENTION

It is therefore an object of the present invention to resolve the problems discussed above and provide a cylindrical fluid-filled vibration-damping device which suppresses the occurrence of stick slip due to friction between the inner circumferential surface of the outer cylindrical sleeve and the stopper member, and is able to prevent effectively the accompanying noise when the stopper member strongly strikes the inner circumferential surface of the outer cylindrical sleeve due to excessive vibrational input.

The above and/or other objects may be attained according to at least one of the following modes of the invention. The following preferred modes of the invention may be adopted at any possible optional combinations. It is to be understood that the present invention is not limited to the following modes or combinations of these modes, but may otherwise be recognized based on the thought of the present invention that described in the whole specification and drawings or that may be recognized by those skilled in the art in the light of the disclosure in the whole specification and drawings.

A first mode of the invention provides a cylindrical fluid-filled vibration-damping device comprising: an inner cylindrical sleeve; an intermediate cylindrical sleeve disposed radially outwards of the inner cylindrical sleeve, and having a pair of ring portions at both ends in an axial direction, the connecting portion for integrally connecting the pair of ring portions, and an opening portion surrounded by the ring portions and the connecting portion; a stopper member disposed on an outer circumferential surface of the inner cylindrical sleeve and protruding radially in one direction towards the opening portion of the intermediate cylindrical sleeve; a rubber elastic body having: a pair of sidewall portions connecting the inner cylindrical sleeve with the pair of ring portions of the intermediate sleeve; an arm portion connecting the connecting portion and the inner cylindrical sleeve, while axially connecting the pair of sidewall portions; a recessed portion surrounded by the pair of sidewall portions and the arm portion and opening towards the opening portion; a thin diaphragm portion disposed between the pair of ring portions of the intermediate sleeve and being spaced apart from the inner cylindrical sleeve and the arm portion at a position radially opposite to the recessed portion; and a rubber seal portion disposed on radially outsides of the pair of ring portions; an outer cylindrical sleeve affixed on an outer circumferential surface of the intermediate sleeve, forming a primary fluid chamber filled with a non-compressible fluid inside the recessed portion that is fluid-tightly closed by the rubber seal portion compressed therebetween, forming an auxiliary fluid chamber filled with the fluid and defined by the diaphragm portion, and forming an orifice passage connecting the primary fluid chamber and auxiliary fluid chamber between itself and the connecting portion; and an elastic body striking portion formed of self-lubricating rubber and having a low coefficient of friction and disposed on a side of an inner circumferential surface of the outer cylindrical sleeve so as to be opposite to a tip of the stopper member. Preferably, the self-lubricating rubber has a very low coefficient of friction of 0.1 to 0.5, as compared with normal rubber materials (coefficients of friction of 1.5 to 2.0), for example, and is formed by blending appropriate amounts of fatty acid amide or polyethylene glycol surfactants in rubber materials such as natural rubber (NR), styrene-butadiene rubber (SBR), or butadiene rubber (BR).

In the invention with the above constitution, when vibration is input between the inner cylindrical sleeve and the outer cylindrical sleeve due to vibration of the engine or the like, that vibration can be damped by the elastic action of the rubber elastic body and the resonance of the fluid column of the fluid flowing through the orifice passage between the primary fluid chamber and auxiliary fluid chamber. Furthermore, the provision of the elastic body striking portion on the inner circumferential surface of the outer cylindrical sleeve, which is formed of the self-lubricating rubber and having a low coefficient of friction with respect to the tip of the stopper member, suppresses the occurrence of stick slip, resulting from friction between the inner circumferential surface of the outer cylindrical sleeve and the tip of the stopper member when the vibrational input becomes excessive and the stopper member strongly strikes the inner circumferential surface of the outer cylindrical sleeve. For this reason, the present invention can effectively prevent the occurrence of the noise accompanying stick slip. The use of the self-lubricating rubber within the sealed fluid makes it possible for the fluid-filled vibration-damping device to enhance effect of preventing occurrence of the stick slip, and to provide the enhanced stick slip preventing effect for a long period of time.

A second mode of the invention provides a cylindrical fluid-filled vibration-damping device according to the first mode, further comprising: an arcuate plate shaped mounting member mounted on an outside of the connecting portion, extending circumferentially along the inner circumferential surface of the outer cylindrical sleeve and facing the recessed portion, while engaging with the connecting portion with both circumferential end portions, wherein the elastic body striking portion is adhered to an inner circumferential surface of the mounting member. With this arrangement, since the elastic body striking portion is adhered on the inner circumferential surface of the outer cylindrical sleeve between the pair of ring portions, the above mentioned effective action of the invention is attained and it becomes unnecessary to position the elastic body striking portion when the outer cylindrical sleeve is attached on the outside of the intermediate sleeve and the labor for that purpose is saved. Furthermore, in the case when the rubber seal portion is provided on the outer surface of the ring portions, it is possible to avoid direct contact between the elastic body striking portion with the low coefficient of friction and the rubber seal portion for ensuring the seal between the intermediate sleeve and the outer cylindrical sleeve. For this reason, in the present invention, the junction between the outer cylindrical sleeve and the intermediate sleeve with the rubber seal portion therebetween can be maintained securely and the loosening of the outer cylindrical sleeve is prevented with certainty.

A third mode of the invention provides a cylindrical fluid-filled vibration-damping device according to the first mode, wherein the present invention may also have a arcuate plate shaped mounting member on the outside of the connecting portion, extending edgewise along the inner circumferential surface of the outer cylindrical sleeve and facing the recessed portion, and engaging with the connecting portion with both circumferential end portions; and the elastic body striking portion may be adhered to the inner circumferential surface of the mounting member.

With this arrangement, the mounting member with the elastic body striking portion adhered on the inner circumferential surface thereof, faces the recessed portion opening towards the outer cylindrical sleeve and surrounded by the pair of sidewall portions and the arm portion, extends circumferentially along the inner circumferential surface of the outer cylindrical sleeve, engages at circumferential edge portions thereof with the connecting portion, and are mounted on the outside of the connecting portion. The elastic body striking portion is disposed opposite to the stopper member. For this reason, in the present invention, when the stopper member strongly strikes the inner circumferential surface of the mounting member due to excessive vibrational input, the occurrence of stick slip from friction between the inner circumferential surface of the mounting member and the stopper member because of the elastic body striking portion is suppressed, and the occurrence of the accompanying noise is effectively prevented. Also, since the elastic body striking portion is formed on the mounting member and separately from the outer cylindrical sleeve, the inlay of the outer cylindrical sleeve on the intermediate sleeve can be performed smoothly without being obstructed by the elastic body striking portion.

A fourth mode of the invention provides a cylindrical fluid-filled vibration-damping device according to any one of the first through third modes, wherein the stopper member is formed of a rigid material and coated with a rubber layer, and opposite to the elastic body striking portion of self-lubricating rubber with a spacing therebetween. With this arrangement, upon application of an excess load, the rigid stopper member is brought into abutting contact with the self-lubricating rubber via a rubber layer, whereby the occurrence of stick slip can be eliminated with high efficiency, and a high durability of the elastic body striking portion of self-lubricating rubber. In other words, the combination use of the rigid stopper member, the rubber layer coating the rigid stopper and the elastic body striking portion of the self-lubricating rubber makes it possible to assure all of an excellent stopper function of the stopper member, a prevention of impact noises, and a durability of the self-lubricating rubber, in addition to an excellent elimination of occurrence of stick slips of the stopper member.

With the present invention, an elastic body striking portion of self-lubricating rubber is established integrally with the outer cylindrical sleeve or integrally with a mounting member which is separate from the outer cylindrical sleeve on the inner circumferential surface of the outer cylindrical sleeve, and opposite to the tip of the stopper member projecting from the inner cylindrical sleeve. Thereby is suppressed the occurrence of stick slip due to friction between the stopper member and the inner circumferential surface of the outer cylindrical sleeve when the stopper member strongly strikes the inner circumferential surface of the outer cylindrical sleeve due to excessive vibrational input. As a result, in the present invention, noise accompanying stick slip can be effectively prevented and the ride quality of the vehicle can be improved by the elimination of discomfort to passengers in the vehicle. Also, in the present invention, when a rubber seal portion is established on the outer surface of the ring portion, an elastic body striking portion of self-lubricating rubber with a low coefficient of friction is established on the inner circumferential surface of the outer cylindrical sleeve between the pair of ring portions. Therefore, direct contact between the elastic body striking portion and the rubber seal portion can be avoided and the junction between the ring portions of the outer cylindrical sleeve with the rubber seal portion interposed therebetween is securely maintained. Accordingly, with the present invention, the reliability of the cylindrical fluid-filled vibration-vibration-damping device is improved and the loosening of the outer cylindrical sleeve from the intermediate sleeve is prevented.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
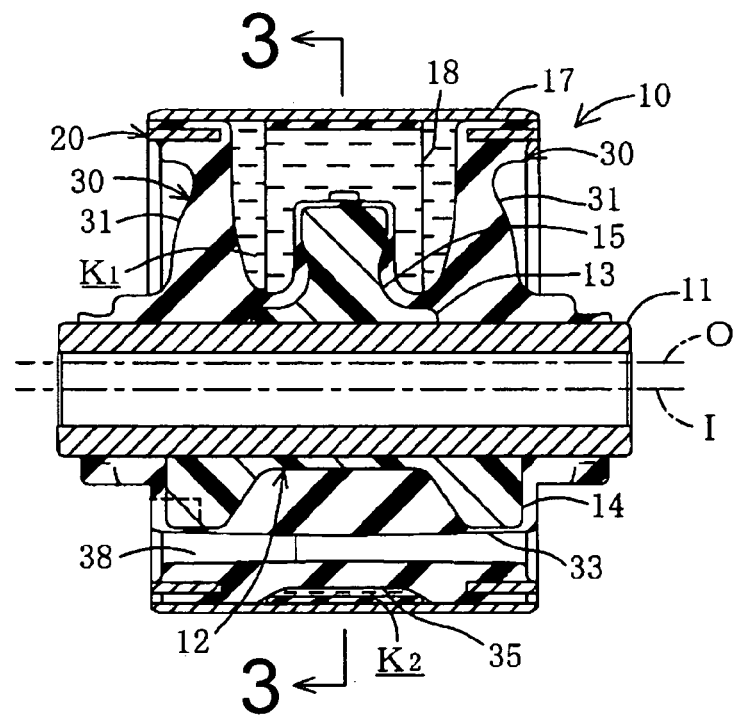
FIG. 1 is a cross sectional view of a fluid-filled vibration damping device of construction according to one preferred embodiment of the invention, taken along line 1-1 of FIG. 2.
Figure 2:
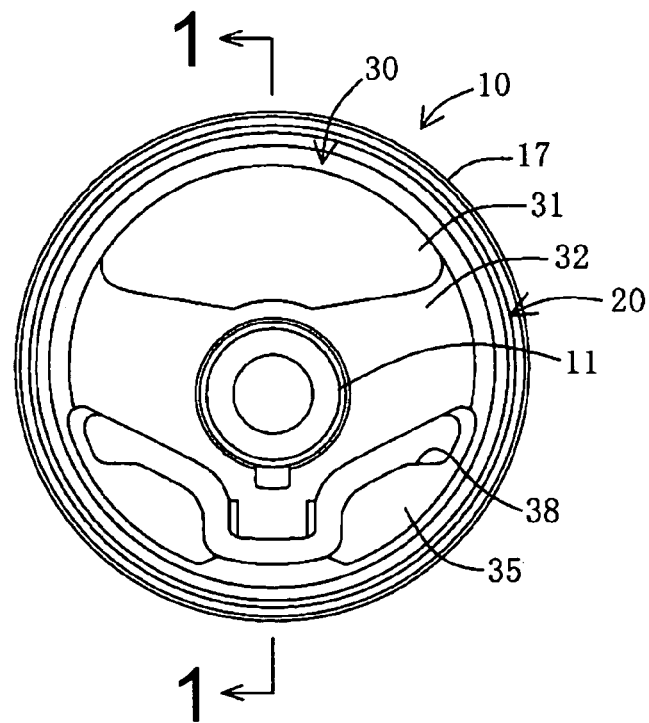
FIG. 2 is a left-side elevational view of the fluid-filled vibration-damping device of FIG. 1.
Figure 3:
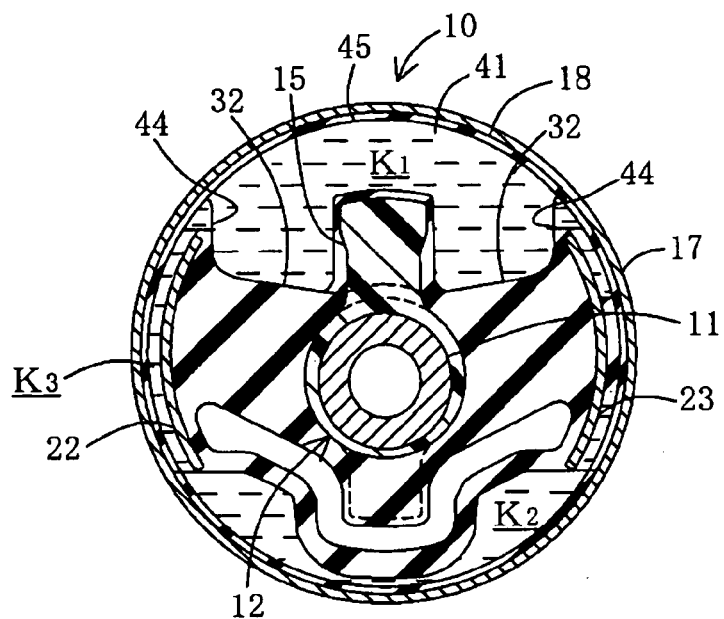
FIG. 3 is a cross sectional view of the fluid-filled vibration-damping device of FIG. 1, taken along line 3-3 of FIG. 1.
Figure 4:
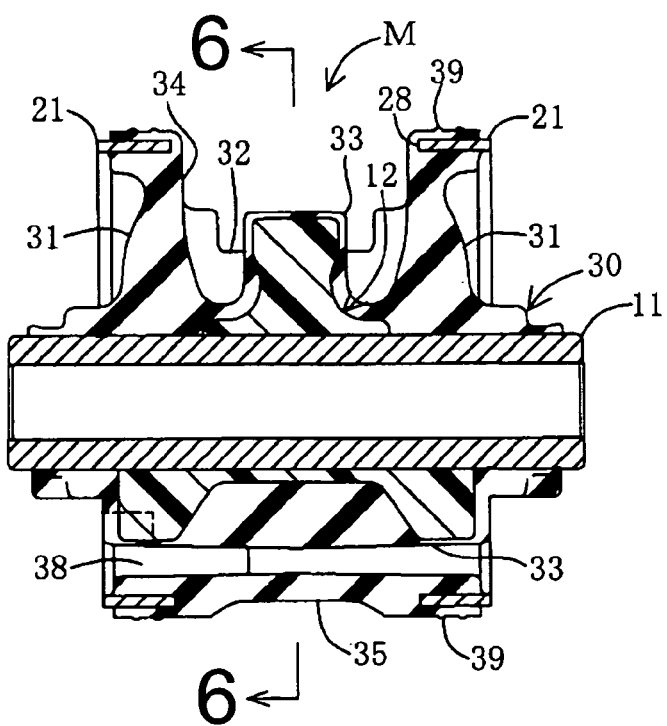
FIG. 4 is a cross sectional view of a vulcanized rubber molded product M of the fluid-filled vibration-damping device of FIG. 1, taken along line 4-4 of FIG. 5.
Figure 5:
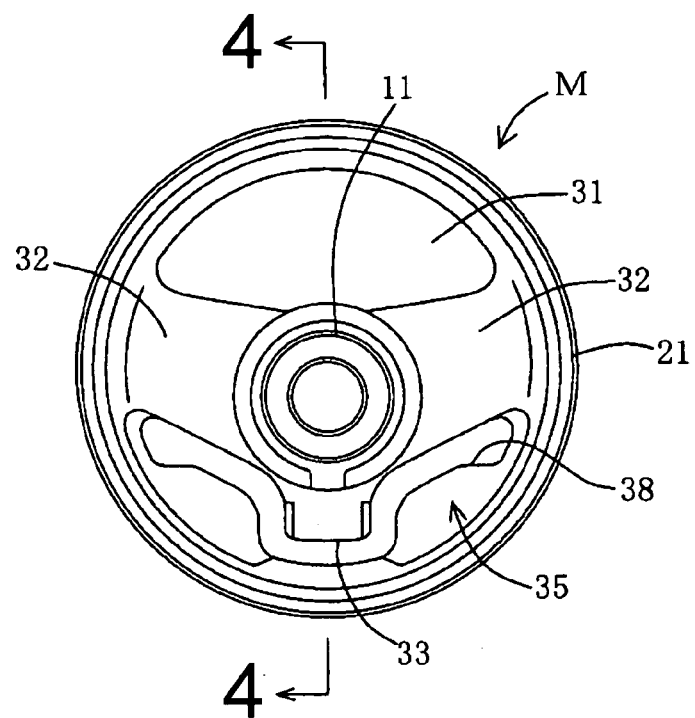
FIG. 5 is a left-side elevational view of the vulcanized rubber molded product M of FIG. 4.
Figure 6:
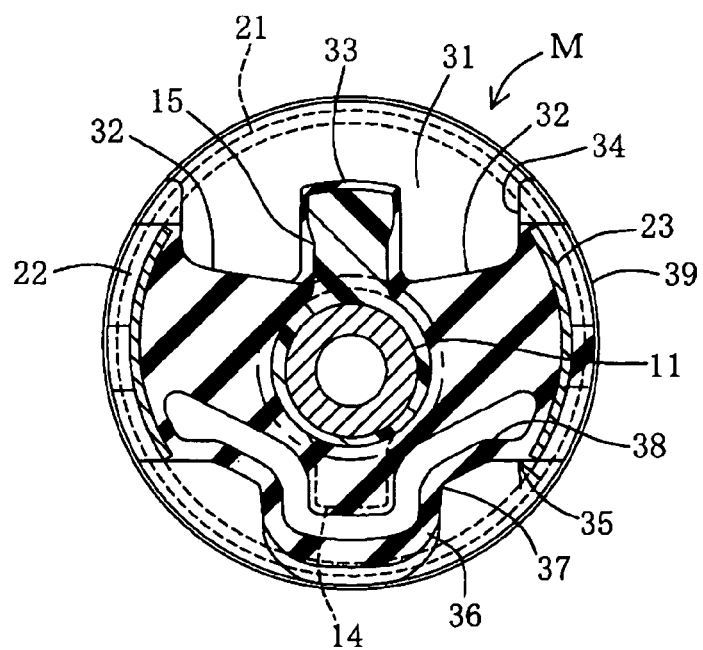
FIG. 6 is a cross sectional view of the vulcanized rubber molded product M taken along line 6-6 of FIG. 4.
Figure 7:
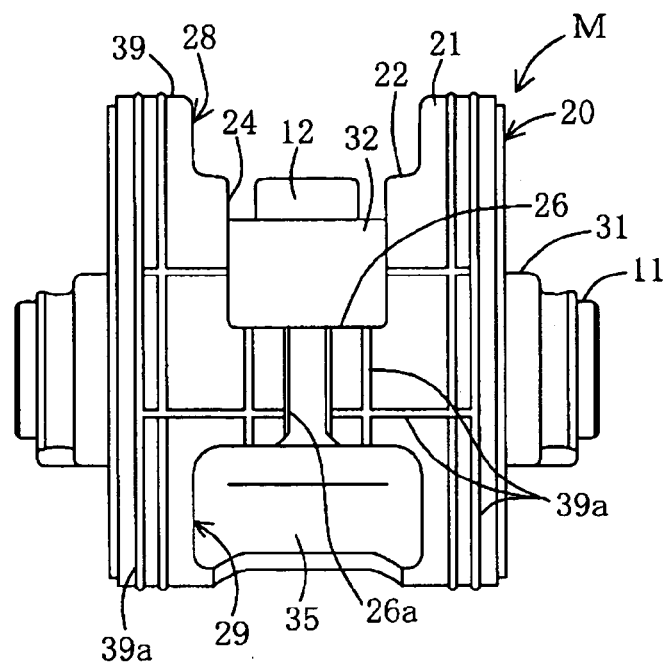
FIG. 7 is a front elevational view of the vulcanized rubber molded product M of FIG. 4.
Figure 8:
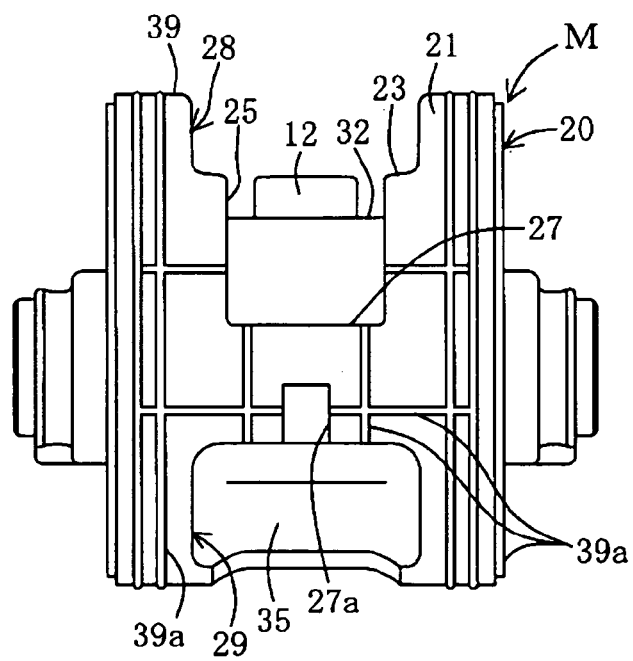
FIG. 8 is a rear-side elevational view of the vulcanized rubber molded product M of FIG. 4.
Figure 9:
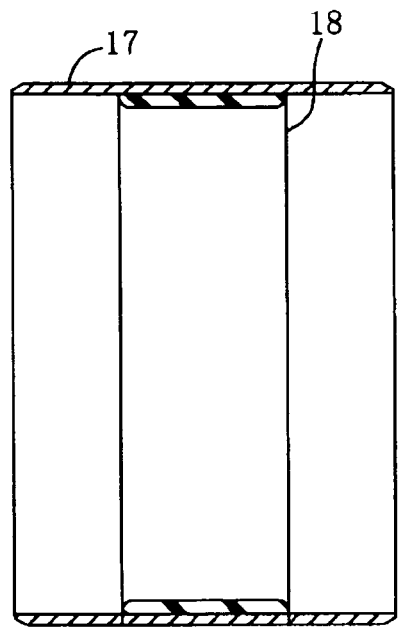
FIG. 9 is an axial cross sectional view of an outer metal sleeve of the fluid-filled vibration-damping device of FIG. 1.

A first embodiment of the present invention is explained below with reference to the drawings. FIGS. 1 through 3 show a cross sectional view taken along line 1-1, a view from the left side, and a cross sectional view taken along line 3-3 of a cylindrical fluid-filled vibration-vibration-damping device 10 of construction according to a first embodiment of the present invention. This device 10 is used as an automotive engine mount. FIGS. 4 through 8 show a cross sectional view taken along line 4-4, a view from the left side, a cross sectional view taken along line 6-6, a front view, and a rear-side view of a vulcanized rubber molded product constituting the fluid-filled vibration-vibration-damping device 10. Also, FIG. 9 shows a cross sectional view of an outer cylindrical sleeve.

The fluid-filled vibration-damping device 10 comprises the following principle constituent elements: an inner cylindrical sleeve 11 of metal; a intermediate sleeve 20 of metal; and an outer cylindrical sleeve 17 of metal, the intermediate sleeve 20 and the outer sleeve 17 being disposed radially outwards of the inner cylindrical sleeve 11 with a given distance therebetween; a stopper member 12 protruding radially from and mounted on the outer circumferential surface of the inner cylindrical sleeve 11 and with its tip side opposite to and with a space between itself and the inner circumferential surface of the outer cylindrical sleeve 17; a rubber elastic body 30 elastically connecting the inner and outer cylindrical sleeves 11 and 17, with a recessed portion 34 opening on the side of the outer cylindrical sleeve 17 and surrounding the stopper member 12, and with a diaphragm portion 35 situated radially opposite to the recessed portion 34; and an elastic body striking portion 18 of self-lubricating rubber and having a low coefficient of friction, adhered to the inner circumferential surface of the outer cylindrical sleeve 17 and situated opposite to the tip of the stopper member 12. This fluid-filled vibration-damping device 10 has a primary fluid chamber K1 and an auxiliary fluid chamber K2 with non-compressible fluid sealed therein. The primary fluid chamber K1 is defined by the recessed portion 34 whose opening is closed by the outer cylindrical sleeve 17, and the auxiliary fluid chamber K2 is defined by the diaphragm portion 35 whose opening is closed by the outer cylindrical sleeve 17. An orifice passage K3 is formed between the outer cylindrical sleeve 17 and connecting portions of the intermediate sleeve, for allowing the fluid to flow between the fluid chambers K1 and K2. Moreover, the left and right, up and down, and fore and aft directions for the fluid-filled vibration-damping device 10 shall be coincide with the left and right, up and down, and fore and aft (the perpendicular to the surface of the page shown in FIG. 1) directions of FIG. 1, unless otherwise specified.

The inner cylindrical sleeve 11 is a thick, small diameter pipe, having an axial length that is greater than the intermediate sleeve 20 and the outer cylindrical sleeve 17. Both axial ends of the inner cylindrical sleeve 11 project axially outward beyond both ends of the intermediate sleeve 20 and the outer cylindrical sleeve 17. The stopper member 12 is a cylindrical member of resin or metal, and comprises: a cylinder portion 13, with its axial central portion tubular in form and both axial sides being semi cylindrical in form with approximately half of the periphery (upper half, in the drawing) being cut away; and a pair of downward projecting portions 14 projecting radially downwards from the semi cylindrical portion of the cylinder portion 13. An upward projecting portion 15 projecting radially upwards from the cylinder portion 13 on the side radially opposite to the downward projecting portions 14. The stopper member 12 faces the upward projecting portion 15 and downward projecting portion 14 in the vertical direction in the drawing, which is the direction of principal vibrational input, and is affixed with adhesive or the like to the outer surface of the inner cylindrical sleeve 11 on the cylinder portion 13.

The intermediate sleeve 20 is a thin-walled, large diameter sleeve. As shown in FIGS. 7 and 8, a pair of connecting portions 22, 23 extend in an axial direction, from two locations (fore and aft, in the drawing) opposite in the approximate radial direction to the pair of ring portions 21 on both ends in the axial direction, and connect both ring portions 21. The circumferential edges of the connecting portions 22, 23 are parallel in the axial direction and broad in the circumferential direction. The connecting portions 22, 23 have recessed portions 24, 25 cut from the upper edge side in a roughly rectangular shape at a location slightly to the inside from both sides in an axial direction, and become the intermediate connecting portions 26, 27, the circumferential width of which is approximately half that of both axial sides in the area of the recessed portion 24, 25. Furthermore, the axial central portion of one intermediate connecting portion 26 (front, in the drawing) becomes the connection-forming recessed portion 26a, recessed in the axial direction in the entire circumference and having a form with a rectangular cross section. Also, the axial central portion of the other intermediate connecting portion 27 becomes the recessed portion 27a, the lower circumferential half being recessed in an axial direction. With this arrangement, the intermediate sleeve 20 is surrounded by a pair of ring portions 21 and a pair of connecting portions 22, 23 and forms opening portions 28, 29, opening upwards and downwards. The circumferential central positions of the opening portions 28, 29 correspond to the direction in which project the upward projecting portion 15 and downward projecting portion 14 of the above mentioned stopper member 12.

The rubber elastic body 30 comprises a pair of thick sidewall portions 31 connected between the upper side half of the pair of ring portions 21 and the inner cylindrical sleeve 11. Between the pair of sidewall portions 31 and within the inner cylindrical sleeve 20 are established a pair of armed portions 32 which extended in an axial direction and connect sidewall portions 31, and also connect the connecting portions 22, 23 and the inner cylindrical sleeve 11. The arm portions 32 have an approximate V-shape, slightly inclined upwards radially on both sides to either side of the inner cylindrical sleeve 11. Also, a rubber layer in the form of a thin portion 33 extending from the arm portions 32 covers the entire surface of the stopper member 12. In this way, surrounded by the pair of sidewall portions 31 and arm portions 32, the recessed portion 34 opens towards the opening portion 28 on the upper side of the intermediate sleeve 20. Furthermore, the diaphragm portion 35, which is of thin rubber, is disposed at a distance from the inner cylindrical sleeve 11 and the arm portions 32, between the inner surface of the pair of ring portions 21 of the intermediate sleeve 20 and the lower side inner edge portions of the connecting portions 22, 23. The diaphragm portion 35 is adhered on the inner circumferential surface of both ring portions 21 and the lower inner edge portions of the connecting portions 22, 23, to thereby cover the lower opening portion 29 on the axial center side.

The peripheral central portion of the diaphragm portion 35 bulges downward in a U shape and becomes the U-shaped portion 36 which depends to the position of the lower opening portion 29 of the intermediate sleeve 20. The peripheral sides of the diaphragm portion 35, which are opposed to each other with the U-shaped portion 36 therebetween in the circumferential direction, provide a pair of curved recessed portions 37, concave in the axial direction. A gap portion 38, which is a flat, U-shaped space between both axial ends, is formed between the above mentioned arm portions 32 and the diaphragm portion 35. Also, a thin rubber seal portion 39 is formed by adhesion on the outer surface, excluding a passage-forming recessed portion 26a and the recessed portion 27a of the intermediate sleeve 20. On the outer surface of the rubber seal portion 39, as shown in FIGS. 7 and 8, is disposed a linear protrusion 39a, which extends along the entire periphery over the ring portions 21, and extends axially over the connecting portions 22, 23, and extends edgewise on both sides to the outside of the passage-forming recessed portion 26a and the recessed portion 27a of the intermediate connecting portions 26, 27. By vulcanization and molding with the inner cylindrical sleeve 11 and intermediate sleeve 20 set in a mold which is not shown, the rubber elastic body 30, comprising the side wall portion 31, arm portion 32, diaphragm portion 35, and rubber seal portion 39, is formed integrally with a vulcanized rubber molded product M which is an intermediate product including the inner cylindrical sleeve 11 and the intermediate sleeve 20, as shown in FIGS. 4 through 8. Moreover, at the vulcanization and molding stage of the vulcanized rubber molded product M, the axial position O of the intermediate sleeve 20 is placed slightly above and at a distance from the axial position I of the inner cylindrical sleeve 11.

The outer cylindrical sleeve 17 is a thin sleeve having an axial length that is the same as the intermediate sleeve 20 and an inner diameter that is slightly larger than the outer diameter of the intermediate sleeve 20. As shown in FIG. 9, a thin elastic body striking portion 18 of self-lubricating rubber is adhered in a band and formed over about one-third of the axial length in the axial center on the inner circumferential surface of the outer cylindrical sleeve 17. The position at which the elastic body striking portion 18 is formed is separate from the position of the rubber seal portion 39 established on the outer edge of the ring portions 21 of the intermediate sleeve 20 when the outer cylindrical sleeve 17 is placed on the outside of the vulcanized rubber molded product M, so that the elastic body striking portion 18 is not in contact with the rubber seal portion 39.

The above mentioned vulcanized rubber molded product M and the outer cylindrical sleeve 17 are immersed in a tank filled with a non-compressible fluid such as water, alkylene glycol, or the like. The outer cylindrical sleeve 17 is placed coaxially on the outside of the intermediate sleeve 20 of the vulcanized rubber molded product M, and the passage-forming recessed portion 26a, recessed portion 34, and curved recessed portion 37 are filled with fluid. Furthermore, with the constriction of the outside of the outer cylindrical sleeve 17 through a drawing operation, the outer cylindrical sleeve 17 compresses the rubber seal portion 39 adhered on the outside of the ring portions 21 and is attached in a compressed state on the outside of the vulcanized rubber molded product M. The fluid-filled vibration-damping device 10 of construction according to the first embodiment is thereby attained. Thereby, the opening side of the recessed portion 34 of the rubber elastic body 30 is occluded in a fluid tight manner and form the primary fluid chamber K1 which is filled with fluid. The opening side of the curve recessed portion 37 of the diaphragm portion 35 is occluded in a fluid tight manner and forms the auxiliary fluid chamber K2 which is filled with fluid. Also, fluid is sealed within the passage-forming recessed portion 26a and forms the orifice passage K3 connecting the primary fluid chamber K1 and the auxiliary fluid chamber K2. Furthermore, the elastic body striking portion 18, of self-lubricating rubber and established on the inner circumferential surface of the outer cylindrical sleeve 17, is placed opposite to the tip of the upward projecting portion 15 of the stopper member 12.

With the above mentioned fluid-filled vibration-damping device 10, for example, the inner cylindrical sleeve 11 is connected to a supporting member (not shown) on the vehicle side, while the outer cylindrical sleeve 17 is connected to a supporting member (not shown) on the engine side. Accordingly, the primary fluid chamber K1 and auxiliary fluid chamber K2 are positioned on the upper side and lower side respectively in a vertical direction, which is the direction of primary vibrational input for the engine. The upwards projecting portion 15 and downwards projecting portion 14 of the stopper member 12 are also disposed to point upwards and downwards. In this manner, the fluid-filled vibration-damping device 10 is mounted in a vehicle and the outer cylindrical sleeve 17 moves downward due to the weight of the engine and its axial position O is caused to approximately match the axial position I of the inner cylindrical sleeve 11.

With the engine mount 10 according to the first embodiment of construction as described above, when vibration is input between the inner cylindrical sleeve 11 and outer cylindrical sleeve 17 due to the vibration of the engine or the like, that vibration is damped by the elastic action of the rubber elastic body for 30 and by the resonance action of the fluid column of the fluid flowing between the primary fluid chamber K1 and auxiliary fluid chamber K2 through the orifice passage K3. Also, when excess vibration in the bound direction is input between the inner cylindrical sleeve 11 and outer cylindrical sleeve 17, the upward projecting portion 15 of the stopper member 12 strikes the elastic body striking portion 18 disposed on the inner circumferential surface of the outer cylindrical sleeve 17. When excess vibration in the rebound direction is applied, the displacement between the inner cylindrical sleeve 11 and outer cylindrical sleeve 17 is suppressed to within a fixed range by the downward projecting portion 14 striking the diaphragm portion 35.

Since the elastic body striking portion 18 disposed on the inner circumferential surface of the outer cylindrical sleeve 17 is of self-lubricating rubber with a low coefficient of friction, the occurrence of stick slip due to friction between the elastic body striking portion 18 and the upper projecting portion 15 is suppressed when the above mentioned excess vibration in the bound direction is applied, and the upward projecting portion 15 strongly strikes the inner circumferential surface of the outer cylindrical sleeve 17. As a result, with the first embodiment, noise accompanying stick slip can be effectively prevented and the ride quality of the vehicle can be improved by eliminating discomfort to passengers in the vehicle.

Further, the elastic body striking portion 18 is adhered on the inner circumferential surface of the outer cylindrical sleeve 17 between the pair of ring portions 21, making it possible to eliminate a need to position the elastic body striking portion 18 and the work therefor. Also, the elastic body striking portion 18, of self-lubricating rubber with a low coefficient of friction, is disposed between a pair of ring portions 21, making it possible to prevent the elastic body striking portion 18 from a contact with the rubber seal portion 39 disposed on the outer surface of the ring portions 21 can be avoided. For this reason, in the engine mount 10 according to the first embodiment, the junction with the side of the intermediate sleeve 20 to the outer cylindrical sleeve 17 with the rubber seal portion 39 therebetween is securely maintained. As a result, the loosening of the outer cylindrical sleeve 17 is certainly prevented and the reliability of the fluid-filled vibration-damping device 10 is improved.

Figure 10:
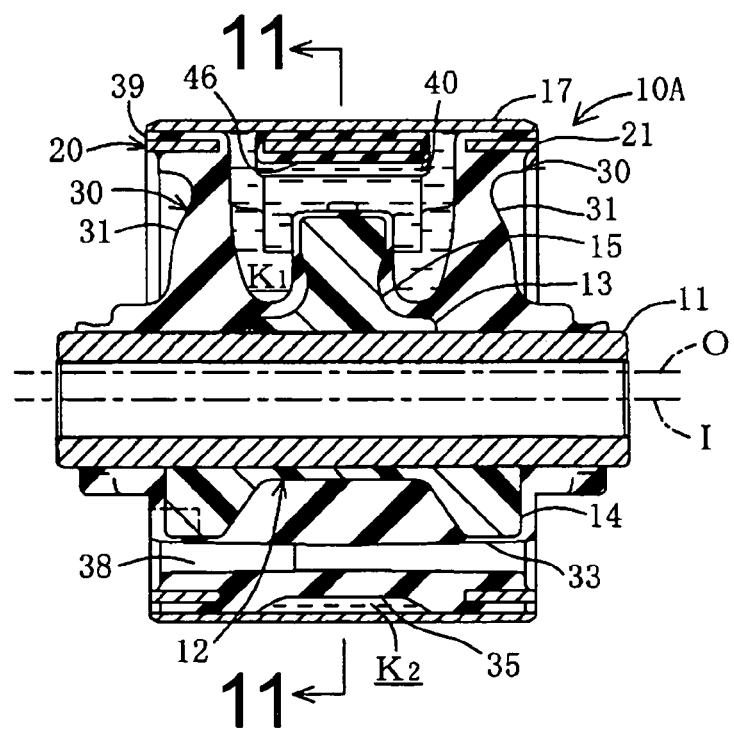
FIG. 10 is a cross sectional view of a fluid-filled vibration damping device of construction according to another preferred embodiment of the invention, taken along line 10-10 of FIG. 11.
Figure 11:
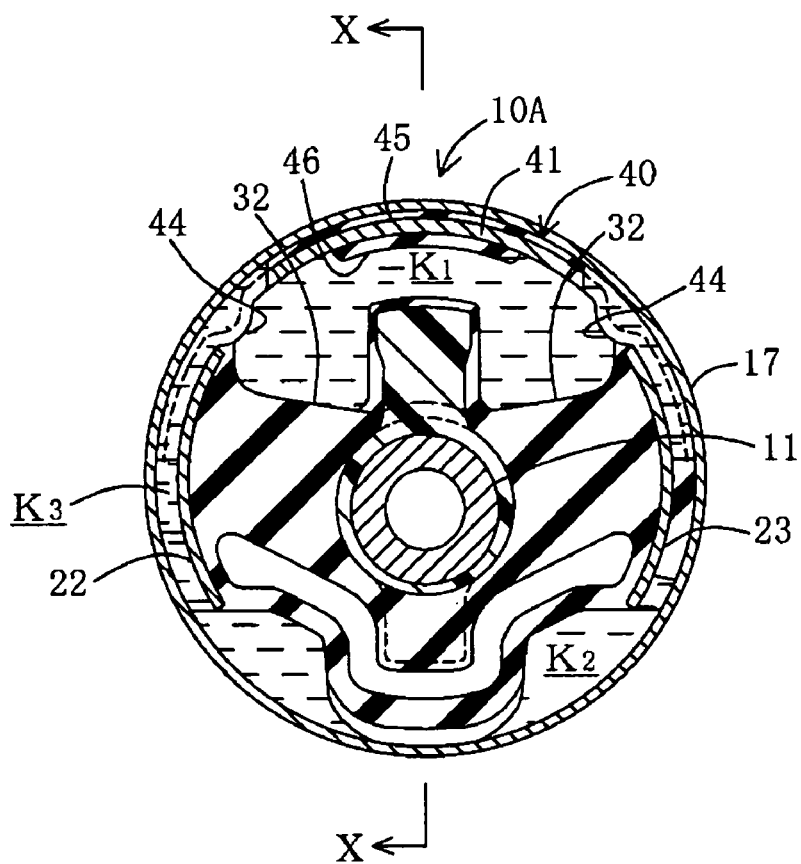
FIG. 11 is a cross sectional view of the fluid-filled vibration-damping device taken along line 11-11 of FIG. 10.
Figure 12:
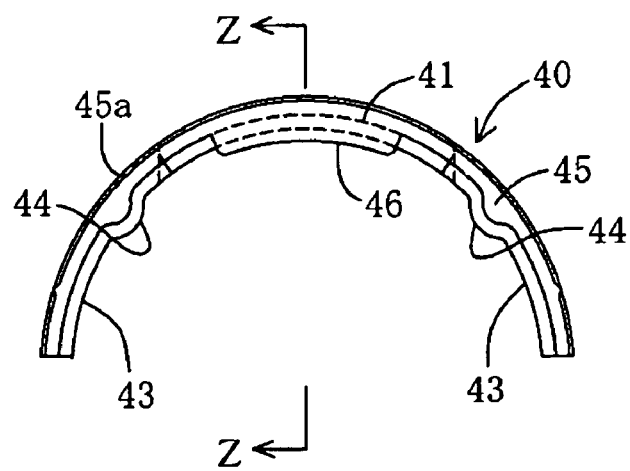
FIG. 12 is a front elevational view of the fluid-filled vibration-damping device of FIG. 10.
Figure 13:
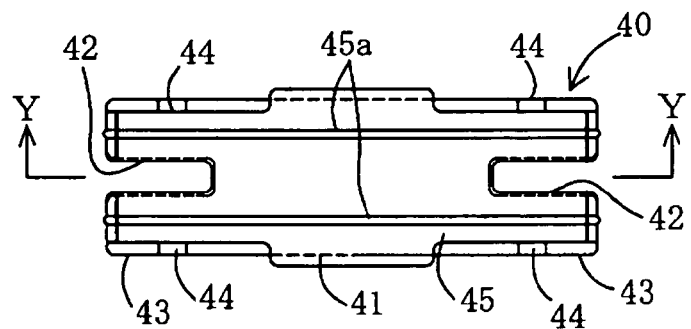
FIG. 13 is a top plane view of a mounting member of the fluid-filled vibration-damping device of FIG. 10.
Figure 14:
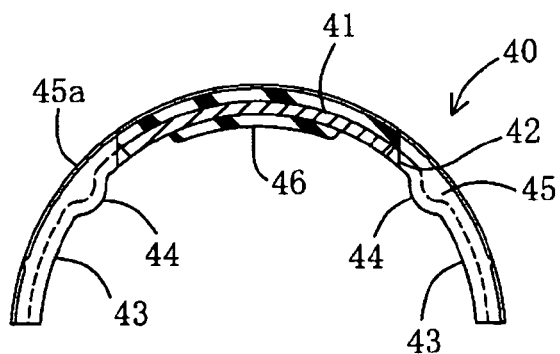
FIG. 14 is a cross sectional view of the mounting member, taken along line Y-Y of FIG. 13.
Figure 15:
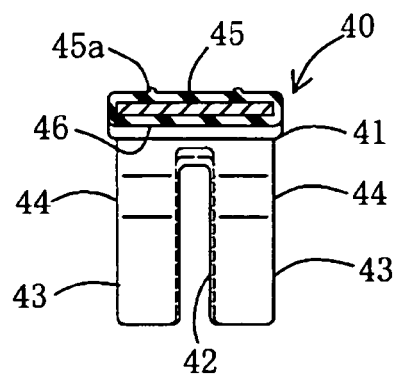
FIG. 15 is a cross sectional view of the mounting member, taken along line Z-Z of FIG. 12.

The second embodiment of the present invention will be explained hereinafter. FIGS. 10 and 11 show cross sectional views of the cylindrical fluid-filled vibration-damping device 10A, which is the second embodiment, taken along line 10-10 and 11-11. FIGS. 12 through 15 show a front view, plan view, a cross-section taken along line Y-Y, and a cross-section taken along line Z-Z of the mounting member 40. Instead of the elastic body striking portion 18 disposed on the inner circumferential surface of the outer cylindrical sleeve 17 in the above mentioned vibration-damping device 10 according to the first embodiment, the cylindrical fluid-filled vibration-damping device 10A according to the second embodiment has a separate mounting member 40 disposed along the periphery of the opening portion 28 of the intermediate sleeve 20, that engages with the connecting portions 22, 23 at the edgewise ends and is mounted on the outside of the connecting portions. The inner cylindrical sleeve 11, stopper member 12, intermediate sleeve 20, and rubber elastic body 30 are the same as in the first embodiment and explained hereinafter using the same reference numerals.

The mounting member 40 is a flat plate of resin or metal and, as shown in FIGS. 12 through 15, has a roughly semicircular disk 41 with a diameter slightly greater than the intermediate sleeve 20 and a width of approximately one-third the axial width of the above mentioned intermediate sleeve 20. A portion of about one-third the length in the axial center of the circular plate 41 becomes a pair of cut out portions 42, cut out in a range of about 45 degrees at a central angle from both ends edgewise. At both sides in a widthwise direction, the mounting member 40 is formed with a pair of circular pieces 43. Also, the portions near the base of each circular piece 43 in the circular plate 41 are provided with engagement recesses 44, facing radially inwards and recessed in a circular shape. In the circular plate 41, the edgewise length between the engagement recesses 44 on both sides edgewise is approximately the same as the edgewise length between the upper sides of the above mentioned pair of connecting portions 22, 23.

Furthermore, the entire area of the outer circumferential surface of the circular plate 41 is covered with a thin upper covering layer 45 of self-lubricating rubber. On the inner circumferential surface side of the circular plate 41, a rubber elastic body striking portion 46 of self-lubricating rubber is disposed between both sides in the widthwise direction at a portion one-third the length in the intermediate portion in the circumferential direction. Both are surrounded and connected on both sides in an axial direction by the circular plate 41. On the upper covering layer 45 is disposed a linear protruding portion 45a extending edgewise on both sides and surrounding the cutout portions 42. The upper covering layer 45 and elastic body striking portion 46 are formed integrally by vulcanization and molding with the circular plate 41.

As shown in FIG. 11, the mounting member 40 engages with each pair of engagement recesses 44 on both sides edgewise on the upper edge portion of the pair of connecting portions 22, 23 of the above mentioned vulcanized rubber molded product M. By superposing the circular pieces 43 on both sides in an edgewise direction over the outer surface of both connecting portions 22, 23, the mounting member 40 is superposed and mounted on the intermediate sleeve 20. The engagement recesses 44 of the mounting member 40 project towards the center and thereby are pressed against the base portions of the arms 32 connected with the connecting portions 22, 23.

With this arrangement, the outer cylindrical sleeve 17 and the vulcanized rubber molded product M with the mounting member 40 mounted on the inner intermediate sleeve 20 are immersed in a tank filled with a non-compressible fluid such as water or alkylene glycol. The outer cylindrical sleeve 17 is coaxially disposed on the outside of the intermediate sleeve 20 of the vulcanized rubber molded product M and the passage-forming recessed portion 26a, recessed portion 34, and curved recessed portion 37 are filled with liquid. Furthermore, with the constriction of the outside of the outer cylindrical sleeve 17, the outer cylindrical sleeve 17 compresses the rubber seal portion 39 on the outside of the vulcanized rubber molded product M and is attached in a compressed state on the outside of the vulcanized rubber molded product M. The fluid-filled vibration-damping device 10A of construction according to the second embodiment is thereby attained, the same way as the above mentioned first embodiment.

With the second embodiment with the above constitution, when vibration is input between the inner cylindrical sleeve 11 and outer cylindrical sleeves 17 due to the vibration of the engine or the like, that vibration is damped by the elastic action of the rubber elastic body for 30 and by the resonance action of the fluid column of the fluid flowing between the primary fluid chamber K1 and auxiliary fluid chamber K2 through the orifice passage K3. Also, when excess vibration in the bound direction is input between the inner cylindrical sleeve 11 and outer cylindrical sleeve 17, the upward projecting portion 15 of the stopper member 12 strikes the elastic body striking portion 46 disposed on the inner circumferential surface of the mounting member 40 pressed against the outer cylindrical sleeve 17. When excess vibration in the rebound direction is applied, the displacement between the inner cylindrical sleeve 11 and outer cylindrical sleeve 17 is suppressed to within a fixed range by the downward projecting portion 14 striking the diaphragm portion 35.

Since the elastic body striking portion 18 disposed on the inner circumferential surface of the mounting member 40 is of self-lubricating rubber with a low coefficient of friction, the occurrence of stick slip due to friction between the elastic body striking portion 18 and the upper projecting portion 15 is suppressed when the above mentioned excess vibration in the bound direction is input and the upward projecting portion 15 strongly strikes the inner circumferential surface of the mounting member 40. As a result, with the second embodiment as well, noise accompanying stick slip can be effectively prevented and the ride quality of the vehicle can be improved by eliminating discomfort to passengers in the vehicle. Furthermore, in the second embodiment, the elastic body striking portion 46 is disposed in the axial center of the outer cylindrical sleeve 17, and contact with the rubber seal portion 39 formed on the outer circumferential surface of both ring portions 21 of the intermediate sleeve 20 can be avoided. As a result, the junction of the outer cylindrical sleeve 17 and the intermediate sleeve 20 with the rubber seal portion 39 interposed therebetween can be securely maintained. Thus, the loosening of the outer cylindrical sleeve 17 can be certainly prevented and the reliability of the fluid-filled vibration-damping device 10A can be improved. Also, in the second embodiment, the elastic body striking portion 46 is formed on the mounting member 40 separately from the outer cylindrical sleeve 17, so that the inlay of the outer cylindrical sleeve 17 on the outside of the vulcanized rubber molded product M can be performed smoothly.

Moreover, in each of the above mentioned embodiments, the rubber seal portion is adhered on the outer surface of a pair of ring portions. However, it is also possible to have the rubber seal portion mounted on the inner surface on both ends in an axial direction opposite the ring portions of the outer cylindrical sleeve. Also, for the connecting portions of the intermediate sleeve, instead of having a pair of radially opposite opening portions surrounded by connecting portions and ring portions, a single opening portion may also be used as a single connecting portion connecting between a pair of ring portions over half the circumference. Furthermore, with each of the above mentioned embodiments, a auxiliary fluid chamber is formed between the outer cylindrical sleeve and the diaphragm portion, but is also possible to have the auxiliary fluid chamber formed between the diaphragm portion and the connecting portion of the intermediate sleeve.

While the preferred embodiment of the present invention have been described in detail for illustrative purpose only, the present invention may be embodied with various other changes, modifications and improvements, which may occur to those skilled in the art, without departing from the spirit and scope of the invention defined in the following claims. For instance, the explanation concerned the case where the outer cylindrical sleeve is mounted on a member on the engine side and the inner cylindrical sleeve is mounted on a member on the vehicle side. However, it is also possible for the mounting of the inner cylindrical sleeve and the outer cylindrical sleeve to be the opposite of this case. Otherwise, this is one example for the cylindrical fluid-filled vibration-damping device disclosed in the above embodiments, and it is possible to make various modifications within the scope of the present invention. Further, while the elastic body striking portion of self-lubricating rubber is provided on the inner circumferential surface of the outer cylindrical sleeve 17, it may be possible to provide the self-lubricating rubber on the projecting end face of the stopper member 12.

The present invention is useful for the following reasons. When the stopper member strongly strikes the inner circumferential surface of the outer cylindrical sleeve due to excess vibrational input, the occurrence of stick slip due to friction between the stopper member and the elastic body striking portion is suppressed by establishing an elastic body striking portion of self-lubricating rubber integrally or separately from the outer cylindrical sleeve on the inner circumferential surface of an outer cylindrical sleeve opposite to the tip of a stopper member projecting from the inner cylindrical sleeve. The noise accompanying stick slip can be effectively prevented and the loosening of the outer cylindrical sleeve is certainly prevented by establishing the elastic body striking portion to the axial center of the outer cylindrical sleeve and avoiding contact with the rubber seal portion.

What is claimed is:

1. A cylindrical fluid-filled vibration-damping device comprising:
   an inner cylindrical sleeve;
   an intermediate cylindrical sleeve disposed radially outwards of the inner cylindrical sleeve, and having a pair of ring portions at both ends in an axial direction, a connecting portion for integrally connecting the pair of ring portions, and an opening portion surrounded by the ring portions and the connecting portion;

a stopper member disposed on an outer circumferential surface of the inner cylindrical sleeve and protruding radially in one direction towards the opening portion of the intermediate cylindrical sleeve;

a rubber elastic body having: a pair of sidewall portions connecting the inner cylindrical sleeve with the pair of ring portions of the intermediate sleeve; an arm portion connecting the connecting portion and the inner cylindrical sleeve, while axially connecting the pair of sidewall portions; a recessed portion surrounded by the pair of sidewall portions and the arm portion and opening towards the opening portion; a thin diaphragm portion disposed between the pair of ring portions of the intermediate sleeve and being spaced apart from the inner cylindrical sleeve and the arm portion at a position radially opposite to the recessed portion; and a rubber seal portion disposed on radially outsides of the pair of ring portions;

an outer cylindrical sleeve affixed on an outer circumferential surface of the intermediate sleeve, forming a primary fluid chamber filled with a non-compressible fluid inside the recessed portion that is fluid-tightly closed by the rubber seal portion compressed therebetween, forming an auxiliary fluid chamber filled with the fluid and defined by the diaphragm portion, and forming an orifice passage connecting the primary fluid chamber and auxiliary fluid chamber between the outer cylindrical sleeve and the connecting portion; and an elastic body striking portion formed of self-lubricating rubber and having a low coefficient of friction and disposed on a side of an inner circumferential surface of the outer cylindrical sleeve so as to be opposite to a tip of the stopper member, wherein the stopper member is formed of a rigid material and coated with a rubber layer, and is opposite to the elastic body striking portion of self-lubricating rubber with a spacing therebetween, so as to be adapted to come into abutting contact against the elastic body striking portion of self-lubricating rubber; and the elastic body striking portion of self-lubricating rubber is separate from the rubber elastic body including the rubber seal portion.

2. A fluid-filled vibration-damping device according to claim 1, wherein the elastic body striking portion is adhered to the inner circumferential surface of the outer cylindrical sleeve at a location between the pair of ring portions.

3. A fluid-filled vibration-damping device comprising:

an inner cylindrical sleeve;

an intermediate cylindrical sleeve disposed radially outwards of the inner cylindrical sleeve, and having a pair of ring portions at both ends in an axial direction, a connecting portion for integrally connecting the pair of ring portions, and an opening portion surrounded by the ring portions and the connecting portion;

a stopper member disposed on an outer circumferential surface of the inner cylindrical sleeve and protruding radially in one direction towards the opening portion of the intermediate cylindrical sleeve;

a rubber elastic body having: a pair of sidewall portions connecting the inner cylindrical sleeve with the pair of ring portions of the intermediate sleeve; an arm portion connecting the connecting portion and the inner cylindrical sleeve, while axially connecting the pair of sidewall portions; a recessed portion surrounded by the pair of sidewall portions and the arm portion and opening towards the opening portion; a thin diaphragm portion disposed between the pair of ring portions of the intermediate sleeve and being spaced apart from the inner cylindrical sleeve and the arm portion at a position radially opposite to the recessed portion; and a rubber seal portion disposed on radially outsides of the pair of ring portions;

an outer cylindrical sleeve affixed on an outer circumferential surface of the intermediate sleeve, forming a primary fluid chamber filled with a non-compressible fluid inside the recessed portion that is fluid-tightly closed by the rubber seal portion compressed therebetween, forming an auxiliary fluid chamber filled with the fluid and defined by the diaphragm portion, and forming an orifice passage connecting the primary fluid chamber and auxiliary fluid chamber between the outer cylindrical sleeve and the connecting portion;

an elastic body striking portion formed of self-lubricating rubber and having a low coefficient of friction and disposed on a side of an inner circumferential surface of the outer cylindrical sleeve so as to be opposite to a tip of the stopper member, and an arcuate plate shaped mounting member mounted on an outside of the connecting portion, extending circumferentially along the inner circumferential surface of the outer cylindrical sleeve and facing the recessed portion, while engaging with the connecting portion at both circumferential end portions, wherein the elastic body striking portion is adhered to an inner circumferential surface of the mounting member.

4. A fluid-filled vibration-damping device according to claim 3, wherein an outer circumferential surface of the arcuate plate shaped mounting member is covered with a thin covering layer integrally formed with the elastic body striking portion of self-lubricating rubber, and the arcuate plate shaped mounting member is mounted onto the outer cylindrical sleeve via the thin cover layer.

* * * * *